(12) United States Patent
Li et al.

(10) Patent No.: US 12,725,872 B2
(45) Date of Patent: Sep. 1, 2026

(54) BATTERY, ELECTRIC DEVICE, AND METHOD AND DEVICE FOR MANUFACTURING BATTERY

(71) Applicant: CONTEMPORARY AMPEREX TECHNOLOGY (HONG KONG) LIMITED, Hong Kong (CN)

(72) Inventors: Jinfeng Li, Ningde (CN); Cunrui Liu, Ningde (CN); Yangzhi Huang, Ningde (CN); Yongguang Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 588 days.

(21) Appl. No.: 18/343,287

(22) Filed: Jun. 28, 2023

(65) Prior Publication Data

US 2023/0344059 A1 Oct. 26, 2023

Related U.S. Application Data

(63) Continuation of application No. PCT/CN2021/124014, filed on Oct. 15, 2021.

(51) Int. Cl.
*H01M 50/249* (2021.01)
*H01M 10/04* (2006.01)
(Continued)

(52) U.S. Cl.
CPC ..... *H01M 50/249* (2021.01); *H01M 10/0404* (2013.01); *H01M 50/202* (2021.01);
(Continued)

(58) Field of Classification Search
CPC ......... H01M 10/0404; H01M 2220/20; H01M 50/202; H01M 50/213; H01M 50/249;
(Continued)

(56) References Cited

U.S. PATENT DOCUMENTS 9,595,705 B1 3/2017 Buckhout
12,107,292 B2 * 10/2024 Harris ................ H01M 10/653
(Continued)

FOREIGN PATENT DOCUMENTS

CN 101663777 A 3/2010
CN 109428019 A 3/2019
(Continued)

OTHER PUBLICATIONS

Machine translation CN107210401 (Year: 2017).*
(Continued)

*Primary Examiner* — Victoria H Lynch
(74) *Attorney, Agent, or Firm* — Ladas & Parry LLP

(57) ABSTRACT

A battery, an electric device, and a method and device for manufacturing battery are provided. The battery includes: a battery cell; a support for supporting the battery cell; and a box for accommodating the support and the battery cell. The support separates the box into a first chamber and a second chamber. The first chamber is configured to accommodate a first portion of the battery cell, the first portion is provided with a pressure relief mechanism. The second chamber is configured to accommodate a second portion of the battery cell and a binder In the second chamber, the second portion, the support, and the box are fixedly connected through the binder. The pressure relief mechanism actuates when internal pressure of the battery cell reaches a threshold to release the internal pressure.

16 Claims, 8 Drawing Sheets

(51) Int. Cl.

| | |
|---|---|
| ***H01M 50/202*** | (2021.01) |
| ***H01M 50/213*** | (2021.01) |
| ***H01M 50/284*** | (2021.01) |
| ***H01M 50/342*** | (2021.01) |
| ***H01M 50/507*** | (2021.01) |

(52) U.S. Cl.
CPC ....... *H01M 50/213* (2021.01); *H01M 50/284* (2021.01); *H01M 50/3425* (2021.01); *H01M 50/507* (2021.01); *H01M 2220/20* (2013.01)

(58) Field of Classification Search
CPC ........... H01M 50/284; H01M 50/3425; H01M 50/507; Y02E 60/10; Y02P 70/50
See application file for complete search history.

(56) References Cited

U.S. PATENT DOCUMENTS

| | | | | |
|---|---|---|---|---|
| 2005/0055795 | A1* | 3/2005 | Zeiler | H01M 50/204 15/353 |
| 2010/0003581 | A1 | 1/2010 | Kawai | |
| 2013/0209866 | A1* | 8/2013 | Watanabe | H04M 1/0262 429/163 |
| 2014/0065455 | A1 | 3/2014 | Chuang et al. | |
| 2015/0243948 | A1 | 8/2015 | Chuang et al. | |
| 2016/0149174 | A1 | 5/2016 | Okura | |
| 2017/0301904 | A1 | 10/2017 | Buckhout | |
| 2019/0097204 | A1 | 3/2019 | Liposky et al. | |

FOREIGN PATENT DOCUMENTS

| | | | | | |
|---|---|---|---|---|---|
| CN | 109428021 | A | | 3/2019 | |
| CN | 107210401 | B | * | 12/2019 | H01M 50/50 |
| CN | 110587295 | A | | 12/2019 | |
| CN | 209730030 | U | | 12/2019 | |
| CN | 110767855 | A | | 2/2020 | |
| CN | 112467286 | A | | 3/2021 | |
| CN | 212796548 | U | | 3/2021 | |
| JP | 2014071939 | A | | 4/2014 | |

OTHER PUBLICATIONS

Extended European Search Report for EP application No. 21960270.3, dated Feb. 2, 2024.

International Search Report for International Application No. PCT/CN2021/124014, mailed Jul. 15, 2022.

Written Opinion of International Searching Authority for International Application No. PCT/CN2021/214014, mailed Jul. 15, 2022.

First Office Action of EP application No. 21960270.3, dated Aug. 10, 2024.

* cited by examiner

BATTERY, ELECTRIC DEVICE, AND METHOD AND DEVICE FOR MANUFACTURING BATTERY

CROSS REFERENCE TO RELATED APPLICATION

This application is a continuation of International Patent Application No. PCT/CN2021/124014, filed Oct. 15, 2021, which is incorporated by reference in its entirety.

TECHNICAL FIELD

This application relates to the field of battery technologies, and in particular, to a battery, an electric device, and a method and device for manufacturing battery.

BACKGROUND

Energy conservation and emission reduction are crucial to sustainable development of the automobile industry. In this context, electric vehicles, with their advantages in energy conservation and environmental protection, have become an important part of sustainable development of the automobile industry. For electric vehicles, battery technology is an important factor in connection with their development.

In the development of battery technologies, cylindrical batteries are gradually shifting from single-unit use to modular use, to be specific, cylindrical batteries are assembled into large-capacity battery packs for application in the fields such as electric bicycles and electric vehicles. Therefore, how multiple cylindrical battery cells are assembled to improve the assembly efficiency is an urgent problem to be solved.

SUMMARY

This application provides a battery, an electric device, and a method and device for manufacturing battery, so as to improve assembly efficiency of batteries.

According to a first aspect, a battery is provided. The battery includes: a battery cell; a support, where the support is configured to support the battery cell; and a box, where the box is configured to accommodate the support and the battery cell. The support separates the box into a first chamber and a second chamber, where the first chamber is configured to accommodate a first portion of the battery cell, the first portion is provided with a pressure relief mechanism, the second chamber is configured to accommodate a second portion of the battery cell and a binder, and in the second chamber, the second portion, the support, and the box are fixedly connected through the binder. The pressure relief mechanism is configured to be actuated when internal pressure of the battery cell reaches a threshold to release the internal pressure.

In the battery of this embodiment of this application, the inside of the box is separated into the first chamber and the second chamber by the support, where the first chamber accommodates the first portion of the battery cell, the first portion is provided with the pressure relief mechanism, and the second chamber accommodates the second potion of the battery cell and the binder. In the second chamber, the second portion of the battery cell, the support, and the box can be fixedly connected by the binder to ensure that the battery cell and the support can be fixedly installed in the box, thus ensuring stability of the battery. In addition, under the action of the support, after the battery cell is fixed, a region in which the pressure relief mechanism is located is not affected by the binder, ensuring that the pressure relief mechanism can be normally used, further ensuring the safety performance of the battery.

In some embodiments, the support is provided with a first opening, where the first opening communicates with the second chamber, and the first opening is configured for injecting the binder into the second chamber.

During installation of the battery, multiple battery cells and the support can be fastened and installed first, then the battery cells are installed into a lower box body of the box, and finally the binder can be injected directly through the first opening, without affecting the installation and arrangement of other components, which can improve the installation efficiency.

In some embodiments, the support is provided with a binder damper structure, where the binder damper structure is configured to prevent the binder in the second chamber from entering the first chamber.

In some embodiments, the binder damper structure is a first limiting slot, a first limiting strip corresponding to the first limiting slot is provided on the inner surface of a wall of the box, and the first limiting strip is stuck into the first limiting slot to prevent the binder in the second chamber from entering the first chamber.

The cooperation between the first limiting strip and the first limiting slot can increase paths of the binder overflowing into the second chamber, thus preventing the binder from overflowing from the second chamber into the first chamber and avoiding the failure of the pressure relief mechanism caused by the binder overflowing onto the surface of the pressure relief mechanism.

In some embodiments, a second limiting strip corresponding to the first limiting strip is further provided on the inner surface of the wall of the box, the first limiting strip and the second limiting strip form a second limiting slot, and one of side walls of the first limiting slot is stuck into the second limiting slot to prevent the binder in the second chamber from entering the first chamber.

Provision of the two limiting slots for mutual cooperation can further increase overflow paths of the binder so as to reduce the risk of overflow of the binder and to avoid failure of the pressure relief mechanism caused by the binder overflowing and obscuring the surface of the pressure relief mechanism.

In some embodiments, the support includes a first wall, where a second opening is provided in the first wall, the battery cell passes through the second opening, and the first portion and the second portion are located on two sides of the second opening, receptively.

The box may be separated into the first chamber and the second chamber by the first wall, in other words, the first chamber and the second chamber are located on two sides of the first wall, respectively.

In some embodiments, the battery cell includes two first portions, and the support further includes a second wall opposite the first wall, where a third opening is provided in the second wall, and the battery cell passes through the second opening and the third opening, with the second portion being located between the second opening and the third opening, and the two first portions being located on two sides of the second portion, receptively.

Therefore, during installation of the battery cell, a position of each battery cell can be determined only by disposing the battery cell in the corresponding second opening and third opening. This is a simple and fast installation process. Moreover, two end faces of the battery cell lie inside the first chamber, so the pressure relief mechanism and the circuit board assembly provided on the end faces are also located inside the first chamber. In this way, when the binder is injected into the second chamber, the binder does not affect the pressure relief mechanism and the circuit board assembly inside the first chamber, ensuring the safety of the battery.

In some embodiments, the second opening and/or the third opening is provided with an enclosing structure, where the enclosing structure is perpendicular to the first wall or second wall and extends towards the outside of the support, and the enclosing structure is configured to support the battery cell.

The enclosing structure can be configured to support the battery cell, ensuring the stability of the battery cell. In addition, because the enclosing structure is attached to the outer surface of the battery cell, when the binder is injected into the second chamber, the excess binder does not flow out of the second opening or the third opening to enter the first chamber, so the pressure relief mechanism located in the first chamber is not affected, thereby ensuring the normal use of the pressure relief mechanism, and the electrode terminal and circuit board assembly located in the first chamber are not affected either, thereby ensuring the normal installation and use of the battery.

In some embodiments, the first wall is perpendicular to a bottom wall of the box.

In some embodiments, the first portion is further provided with an electrode terminal, where the electrode terminal is electrically connected to a busbar, and the first chamber is further configured to accommodate the busbar.

In some embodiments, the battery further includes a circuit board assembly, where the busbar is disposed on the circuit board assembly, the first chamber is further configured to accommodate the circuit board assembly, the circuit board assembly is provided with a through hole, the support is provided with a limiting post, and the limiting post cooperates with the through hole to limit the circuit board assembly, so as to avoid deflection of the circuit board assembly within the first chamber.

In some embodiments, a boss is provided at an end of the limiting post farther away from the support, where the boss has a radial dimension smaller than the rest of the limiting post, the through hole has a dimension larger than the boss but smaller than the rest of the limiting post to limit the circuit board assembly, so as to avoid relatively large displacement of the circuit board assembly in an axial direction of the limiting post.

In some embodiments, a first buckle is provided on the support, and a second buckle is provided on a side wall of the box, where the first buckle and the second buckle cooperate with each other to secure the support in the box.

In some embodiments, the battery cell is a cylindrical battery cell, the first portion includes an end surface of the cylindrical battery cell, and the pressure relief mechanism is provided on the end surface of the cylindrical battery cell.

The battery cell may include two electrode terminals, where the two electrode terminals may be located on two end faces of the cylindrical battery cell so as to facilitate the electrical connection between multiple battery cells. The pressure relief mechanism is provided on at least one of the two end faces of the cylindrical battery cell.

In some embodiments, a profiling structure is provided on the inner surface of a bottom wall of the box, where the profiling structure is located in the second chamber, a surface of the profiling structure facing toward the second portion is attached to the second portion, and the profiling structure is configured to fill a space between the second portion and the bottom wall of the box.

In this way, when the binder is injected into the second chamber, the profiling structure occupies part of the space inside the second chamber, reducing a space to be filled by the binder and reducing the amount of binder, which can reduce the costs, also avoid the overflow of the binder due to excessive amount of the binder, and improve the safety of the battery.

According to a second aspect, an electric device is provided. The electric device includes the battery according to the first aspect, where the battery is configured to provide electric energy for the electric device.

In some embodiments, the electric device may be a vehicle, a ship, or a spacecraft.

According to a third aspect, a method for manufacturing battery is provided. The method includes: providing a battery cell; providing a support, where the support is configured to support the battery cell; and providing a box, where the box is configured to accommodate the support and the battery cell. The support separates the box into a first chamber and a second chamber, where the first chamber is configured to accommodate a first portion of the battery cell, the first portion is provided with a pressure relief mechanism, the second chamber is configured to accommodate a second portion of the battery cell and a binder, and in the second chamber, the second portion, the support, and the box are fixedly connected through the binder. The pressure relief mechanism is configured to be actuated when internal pressure of the battery cell reaches a threshold to release the internal pressure.

According to a fourth aspect, a device for manufacturing battery is provided. The device includes modules for performing the method according to the third aspect.

Figure 1:
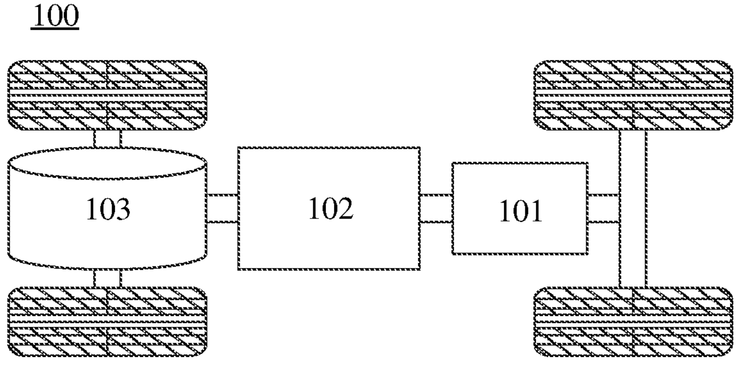
FIG. 1 is a schematic structural diagram of a vehicle according to an embodiment of this application.

The accompanying drawings are not drawn to scale.

DETAILED DESCRIPTION

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

In the descriptions of this application, it should be noted that, unless otherwise stated, "plurality" means two or more; and the orientations or positional relationships indicated by the terms "upper", "lower", "left", "right", "inside", "outside", and the like are merely intended to help the descriptions of this application and simplify the descriptions other than indicate or imply that the apparatuses or components must have specific orientations, or be constructed and manipulated with specific orientations, and therefore shall not be construed as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all are directions shown in the figures, and do not limit the specific structure of the application. In the description of this application, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other regular or irregular shapes, which is not limited in the embodiments of this application either. Battery cells are typically divided into three types by packaging method: cylindrical cell, prismatic cell, and pouch cell. The type of battery is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matters from affecting charging or discharging of the battery cell.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of positive electrode current collector uncoated with the positive electrode active substance layer protrudes out of the part of positive electrode current collector coated with the positive electrode active substance layer and serves as a positive tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. The part of negative electrode current collector uncoated with the negative electrode active substance layer protrudes out of the part of negative electrode current collector coated with the negative electrode active substance layer and serves as a negative tab. The negative electrode current collector may be made of copper, and the negative electrode active substance may be carbon, silicon, or the like. To allow a large current to pass through without any fusing, multiple positive tabs are provided and stacked together, and multiple negative tabs are provided and stacked together. The separator may be made of polypropylene (polypropylene, PP), polyethylene (polyethylene, PE), or the like. In addition, the electrode assembly may be a wound structure or a stacked structure, but the embodiments of this application are not limited thereto.

For the development of battery technologies, many design factors need to be considered, for example, performance parameters such as energy density, cycle life, discharge capacity, and charge and discharge rate, as well as safety of the battery.

For batteries, safety hazards mainly originate in charging and discharging. Therefore, in order to improve the safety performance of batteries, a pressure relief mechanism is often provided for battery cells. The pressure relief mechanism is an element or part that is actuated when internal pressure or temperature of the battery cell reaches a predetermined threshold, so as to relieve the internal pressure or temperature. The predetermined threshold may be adjusted according to different design requirements. The predetermined threshold may depend on the material used for one or more of the positive electrode plate, negative electrode plate, electrolyte, and separator in the battery cell. The pressure relief mechanism may employ an element or part sensitive to pressure or temperature such that the pressure relief mechanism is actuated when the internal pressure or temperature of the battery cell reaches the predetermined threshold, thereby forming a channel for relieving the internal pressure or temperature.

"Actuate" mentioned in this application means that the pressure relief mechanism is put into action such that the internal pressure or temperature of the battery cell is relieved. The action that the pressure relief mechanism is put into may include but is not limited to, for example, cracking, tearing, or melting at least part of the pressure relief mechanism. When the pressure relief mechanism is actuated, high-pressure and high-temperature substances inside the battery cell are discharged from the pressure relief mechanism as emissions. In this way, the battery cell can relieve its pressure under controllable pressure or temperature, thereby avoiding more serious potential incidents.

The emissions from the battery cell mentioned in this application include but are not limited to: electrolyte, fragments of positive and negative electrode plates and separator because of dissolution or breaking, high-temperature and high-pressure gases and flames produced by reactions, and the like.

The pressure relief mechanism in the battery cell greatly influences the safety of the battery. For example, when the battery cell is short-circuited or overcharged, thermal runaway may be caused inside the battery cell, resulting in a sudden rise in pressure or temperature. In this case, the pressure relief mechanism can be actuated to make the internal pressure and temperature discharge to the outside, thus preventing the battery cell from exploding and catching fire.

Therefore, in the battery assembly process, a position of each battery cell should be properly disposed such that the pressure relief mechanism of each battery cell is not affected so as to ensure the safety performance of the battery. Especially for a non-cuboid shaped battery cell such as a cylindrical battery cell, due to the limitation of the shape of the battery cell itself, when multiple battery cells are assembled, full consideration should be given to how to improve space utilization while ensuring the stability and safety of the battery.

Therefore, the embodiments of this application provide a battery. The battery includes multiple battery cells, a support, and a box, where the support is configured to support the battery cells and the box is configured to accommodate the support and the battery cells. Specifically, the support separates a space inside the box into a first chamber and a second chamber, where the first chamber is configured to accommodate a first portion of the battery cell, the first portion includes a pressure relief mechanism, and the second chamber is configured to accommodate a second portion of the battery cell and a binder. In the second chamber, the second portion of the battery cell, the support, and the box can be fixedly connected by the binder to ensure that the battery cell and the support can be fixedly installed in the box, thus ensuring stability of the battery. In addition, under the action of the support, after the battery cell is fixed, a region in which the pressure relief mechanism is located is not affected by the binder, ensuring that the pressure relief mechanism can be normally used, further ensuring the safety performance of the battery.

The technical solution described in the embodiments of this application is applicable to a variety of electric devices using a battery.

The electric device may be a vehicle, a mobile phone, a portable device, a notebook computer, a ship, a spacecraft, an electric toy, an electric tool, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, for example, a game console, an electric toy car, an electric toy ship, an electric toy airplane, and the like. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric device.

For ease of description, the electric device being a vehicle is used as example for description of the following embodiments.

For example, FIG. 1 is a schematic structural diagram of a vehicle 100 according to an embodiment of this application. The vehicle 100 may be a fossil fuel vehicle, a natural-gas vehicle, or a new energy vehicle, where the new energy vehicle may be a battery electric vehicle, a hybrid electric vehicle, a range-extended vehicle, or the like. A motor 103, a controller 102, and a battery 101 may be provided inside the vehicle 100, where the controller 102 is configured to control the battery 101 to supply power to the motor 103. For example, the battery 101 may be disposed at the bottom, front, or rear of the vehicle 100. The battery 101 may be configured to supply power to the vehicle 100. For example, the battery 101 may be used as an operational power source for the vehicle 100 which is configured for a circuit system of the vehicle 100, for example, to satisfy power needs of start, navigation, and running of the vehicle 100. In another embodiment of this application, the battery 101 can be used not only as the operational power source for the vehicle 100, but also as a driving power source for the vehicle 100, replacing or partially replacing fossil fuel or natural gas to provide driving traction for the vehicle 100.

To meet different power usage requirements, the battery may include multiple battery cells, and the multiple battery cells may be connected in series, parallel, or series-parallel, where being connected in series-parallel means a combination of series and parallel connections. The battery may also be called a battery pack. Optionally, multiple battery cells may be connected in series, parallel, or series-parallel to form a battery module first, and then multiple battery modules are connected in series, parallel, or series-parallel to form a battery. In other words, the multiple battery cells may be directly combined into a battery, or may first be combined into battery modules which are then combined into a battery. The embodiments of this application are not limited thereto.

Figure 2:
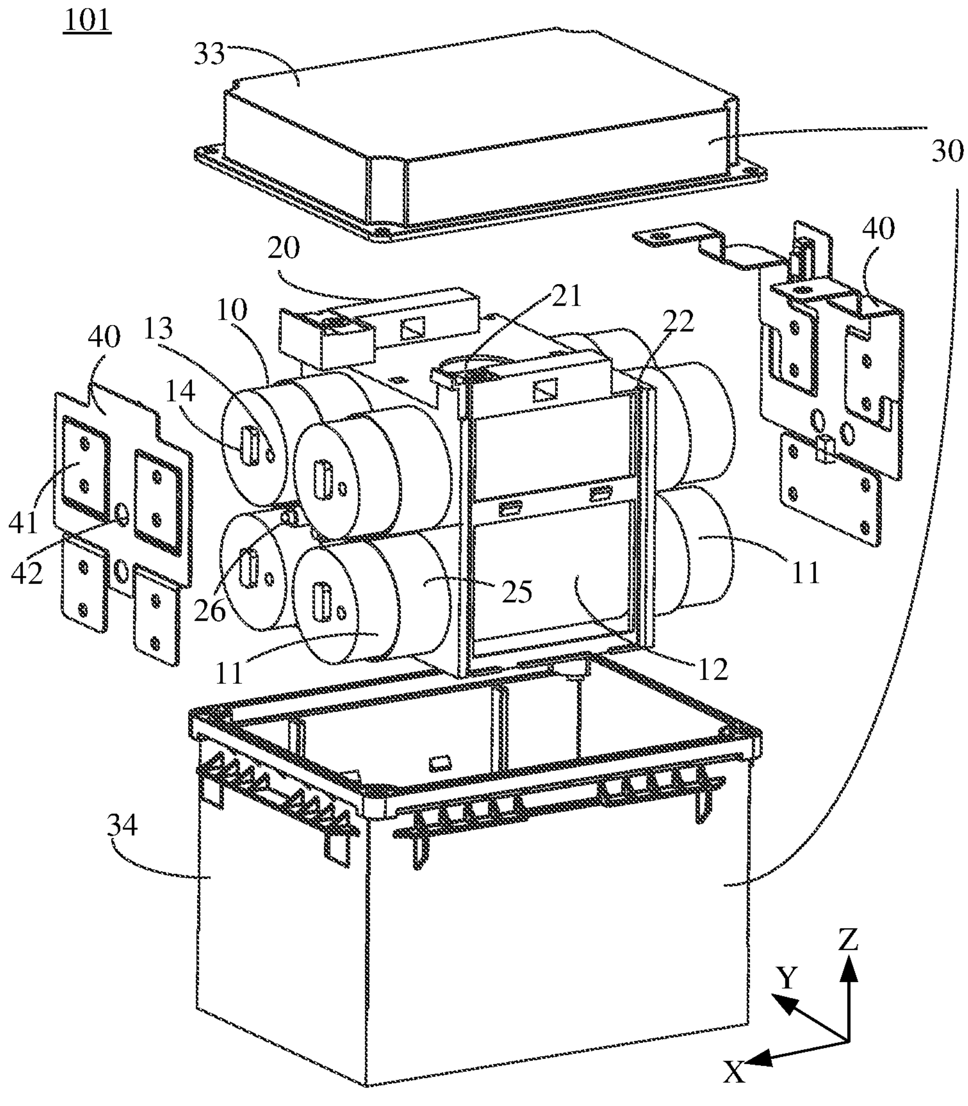
FIG. 2 is a schematic structural exploded view of a battery according to an embodiment of this application.

FIG. 2 is a schematic structural exploded view of a battery 101 according to an embodiment of this application. As shown in FIG. 2, the battery 101 includes: a battery cell 10; a support 20, where the support 20 is configured to support the battery cell 10; and a box 30, where the box 30 is configured to accommodate the support 20 and the battery cell 10. The support 20 separates the box 30 into a first chamber 31 and a second chamber 32, where the first chamber 31 is configured to accommodate a first portion 11 of the battery cell 10, the first portion 11 is provided with a pressure relief mechanism 13, the second chamber 32 is configured to accommodate a second portion 12 of the battery cell 10 and a binder, and in the second chamber 32, the second portion 12, the support 20, and the box 30 are fixedly connected through the binder. The pressure relief mechanism 13 is configured to be actuated when internal pressure of the battery cell 10 reaches a threshold to release the internal pressure.

In the battery 101 of this embodiment of this application, the inside of the box 30 is separated into the first chamber 31 and the second chamber 32 by the support 20, where the first chamber 31 accommodates the first portion 11 of the battery cell 10, the first portion 11 is provided with the pressure relief mechanism 13, and the second chamber 32 accommodates the second potion 12 of the battery cell 10 and the binder. In the second chamber 32, the second portion 12 of the battery cell 10, the support 20, and the box 30 can be fixedly connected by the binder to ensure that the battery cell 10 and the support 20 can be fixedly installed in the box 30, thus ensuring stability of the battery 101. In addition, under the action of the support 20, after the battery cell 10 is fixed, a region in which the pressure relief mechanism 13 is located is not affected by the binder, ensuring that the pressure relief mechanism 13 can be normally used, further ensuring the safety performance of the battery 101.

The following describes the battery 101 of this embodiment of this application in detail with reference to the accompanying drawings.

It should be understood that the battery 101 of this embodiment of this application may include the box 30, where the box 30 has a hollow structure inside to accommodate multiple battery cells 10 and the support 20. Optionally, FIG. 2 illustrates only one possible implementation of the box 30 according to this embodiment of this application. As shown in FIG. 2, the box 30 may include two parts, which are referred to as an upper box body 33 and a lower box body 34 herein in accordance with the orientation shown in FIG. 2 for ease of distinction, where the upper box body 33 and the lower box body 34 are snap-fitted to form a hollow structure of the box 30.

In this embodiment of this application, a shape of the box 30 or a combined shape of the upper box body 33 and the lower box body 34 can be set depending on actual application. For example, this application is illustrated by using a cuboid box 30 as an example, in other words, the upper box body 33 and the lower box body 34 are snap-fitted to form a cuboid structure.

At least one of the upper box body 33 and the lower box body 34 of this embodiment of this application has an opening. For example, as shown in FIG. 2, the upper box body 33 and the lower box body 34 each may be a hollow cuboid and have only one face with an opening, where the opening of the upper box body 33 is disposed opposite the opening of the lower box body 34, and the upper box body 33 and the lower box body 34 are snap-fitted to form the box 30 with a closed chamber.

For another example, unlike FIG. 2, either the upper box body 33 or the lower box body 34 may be a hollow cuboid with an opening, and the other is plate shaped for covering the opening. For example, the lower box body 34 is a hollow cuboid and has only one face with an opening and the upper box body 33 is plate shaped. In such case, the upper box body 33 covers the opening of the lower box body 34 to form the box 30 with a closed chamber. The chamber may be configured to accommodate the multiple battery cells 10. The multiple battery cells 10 are connected in parallel, in series, or in series-parallel, and then placed into the box 30 formed after the upper box body 33 and the lower box body 34 are snap-fitted.

Optionally, for the cuboid box 30, the shape of the battery cells 10 and the support accommodated inside the box 30 can be set depending on the actual application. For ease of description, an approximately cuboid support 20 and a cylindrical battery cell 10 are mainly described below as examples. Specifically, as shown in FIG. 2, the cylindrical battery cell 10 has two circular end faces and a column connecting the two circular end faces. The column portion may include an electrode assembly, where the electrode assembly may be formed by stacking or winding a portion of a positive electrode plate coated with a positive electrode active substance layer and a portion of a negative electrode plate coated with a negative electrode active substance layer. The circular end face may be provided with a pressure relief mechanism 13 and may further be provided with an electrode terminal 14, where the electrical energy of the battery cell 10 is output through the electrode terminal 14. The battery cell 10 may have two electrode terminals 14, where the two electrode terminals 14 are a positive electrode terminal and a negative electrode terminal. For example, as shown in FIG. 2, each electrode terminal 14 may be provided on one circular end face. To be specific, one end face of the cylindrical battery cell 10 is provided with the positive electrode terminal, the other end face is provided with the negative electrode terminal, and the pressure relief mechanism 13 is provided on at least one of the two end faces.

As shown in FIG. 2, the battery 101 may further include a circuit board assembly 40, where the circuit board assembly 40 may include a busbar 41. The busbar 41 is configured to implement an electrical connection between the multiple battery cells 10, for example, a parallel connection, a series connection, or a series-parallel connection. Specifically, the busbar 41 may implement the electrical connection between the battery cells 10 by connecting electrode terminals 14 of the battery cells 10. Further, the busbar 41 may be fixed to the electrode terminals 14 of the battery cell 10 through welding.

Optionally, the circuit board assembly 40 may further include other components. For example, it may further include a circuitry for detecting usage states of the battery cell 10, for example, temperature or voltage. However, the embodiments of this application are not limited thereto.

The battery 101 in this embodiment of this application may include multiple circuit board assemblies 40. For example, as shown in FIG. 2, it may include two circuit board assemblies 40, where the two circuit board assemblies 40 may be located on the two end faces of the battery cell 10, respectively.

Figure 3:
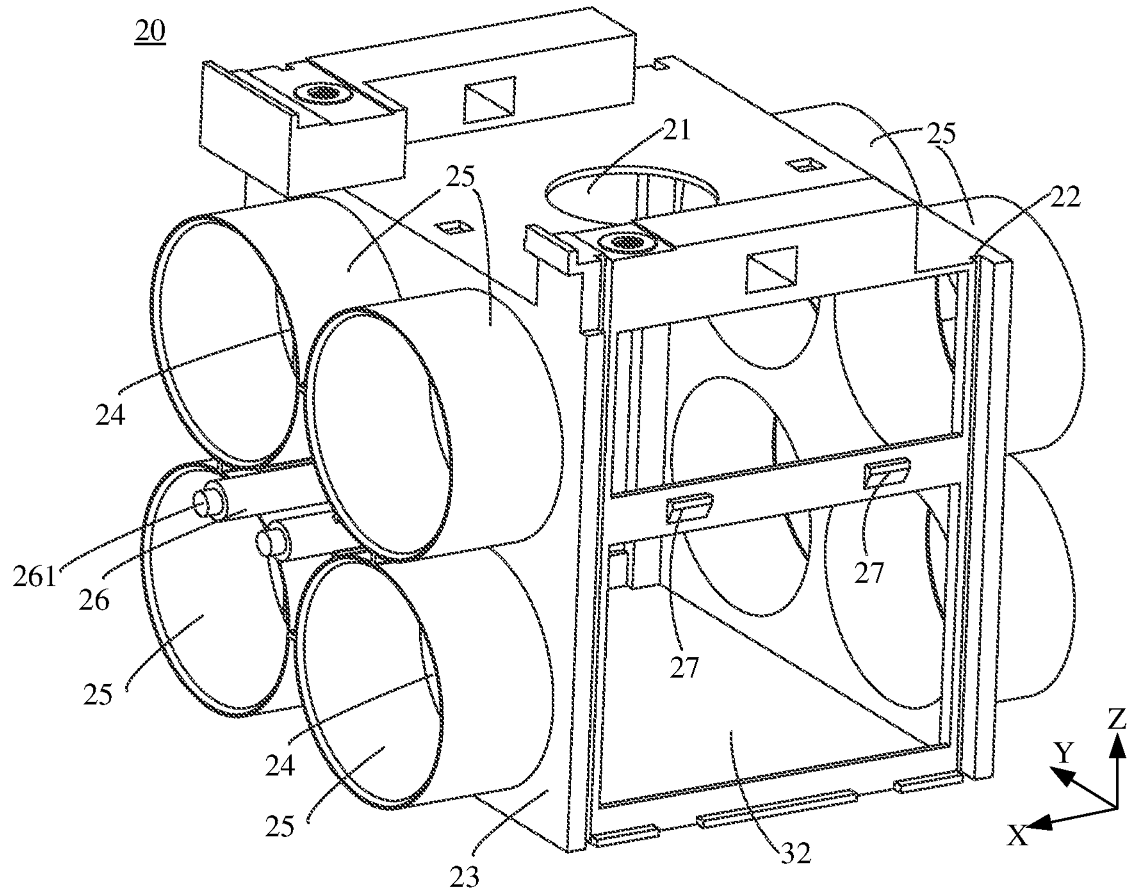
FIG. 3 is a schematic structural diagram of a support according to an embodiment of this application.
Figure 4:
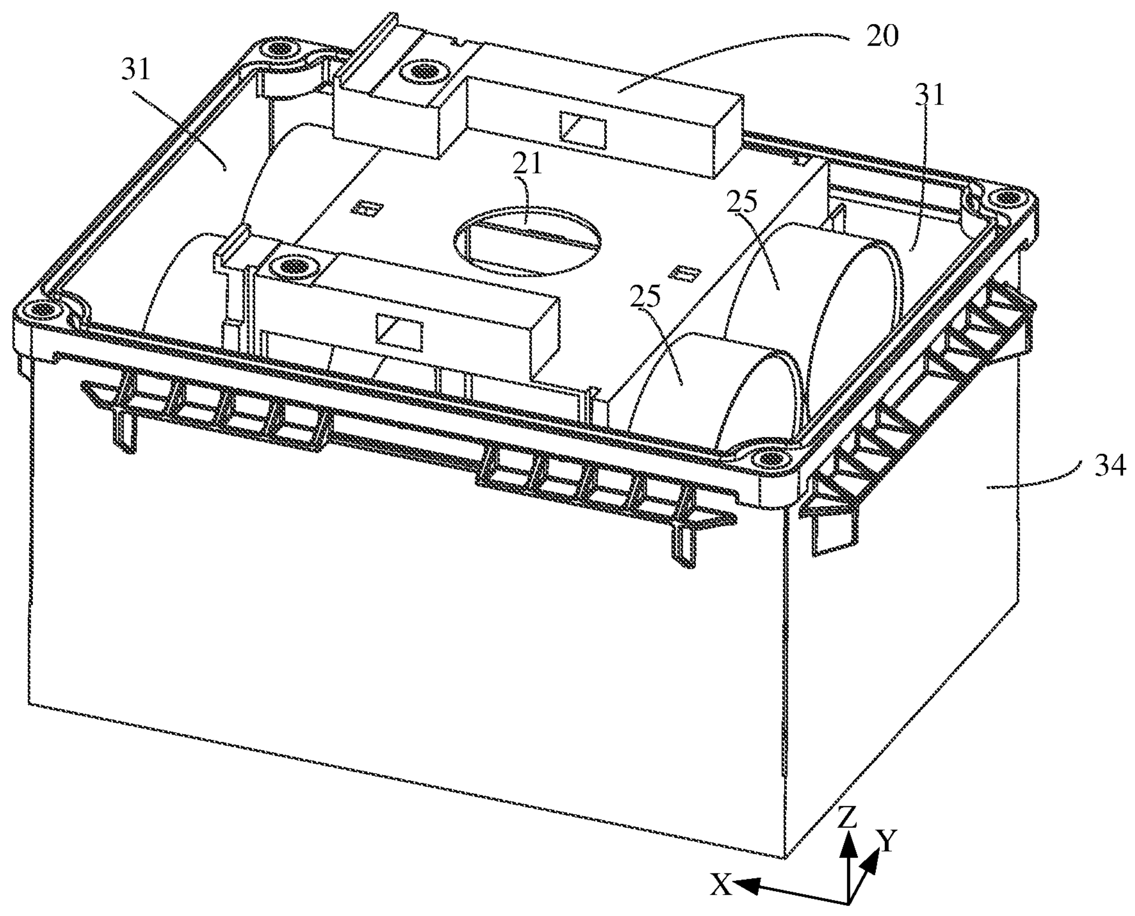
FIG. 4 is a schematic diagram of a structure of a lower box body accommodating a support according to an embodiment of this application.

The following describes the support 20 in this embodiment of this application in detail with reference to the accompanying drawings. FIG. 3 is a schematic structural diagram of the support 20 according to this embodiment of this application, and FIG. 4 is a schematic structural diagram of the lower box body 34 accommodating the support 20 according to this embodiment of this application. As shown in FIG. 2 to FIG. 4, the support 20 is provided with a first opening 21, where the first opening 21 communicates with the second chamber 32, and the first opening 21 is configured for injecting the binder into the second chamber 32 such that the binder can bond and fix the second portion 12 of the battery cell 10, the support 20, and the box 30, so as to ensure the stability of the battery. Optionally, the first opening 21 can be located on a top wall of the support 20, where the top wall of the support 20 is parallel to a bottom wall of the lower box body 34 and located at the opening of the lower box body 34. In this way, during installation of the battery 101, after the multiple battery cells 10 are installed and fixed on the support 20, the multiple battery cells 10 and the support 20 are loaded into the lower box body 34 of the box 30, and finally the binder is directly injected through the first opening 21 on the top wall without affecting the installation and arrangement of other parts, thereby improving the installation efficiency.

It should be understood that the support 20 of this embodiment of this application is disposed inside the box 30 such that the internal space of the box 30 can be separated into the first chamber 31 and the second chamber 32. For example, the support 20 may include a first wall 23 such that the box 30 is separated into the first chamber 31 and the second chamber 32 by the first wall 23. The first wall 23 is perpendicular to the bottom wall of the lower box body 34 and parallel to one of side walls of the lower box body 34.

In this embodiment of this application, a second opening 24 is provided in the first wall 23, where the battery cell 10 passes through the second opening 24 such that the first portion 11 and second portion 12 of the battery cell 10 are located on two sides of the second opening 24, respectively, with the first portion 11 being located in the first chamber 31 and the second portion being located in the second chamber 32. For example, as shown in FIG. 2 to FIG. 4, if the battery

101 includes four battery cells 10, four second openings 24 are provided in the first wall 23 for fixing the four battery cells 10.

In this embodiment of this application, the support 20 for supporting the cylindrical battery cell 10 may be provided as an axisymmetric structure so as to maintain the stability of the structure. Specifically, as shown in FIG. 2 to FIG. 4, the support 20 may further include the second wall opposite the first wall 23, where the second wall is parallel to the first wall 23 such that the box 30 is separated into two first chambers 31 and a second chamber 32 located between the two first chambers 31 by the first wall 23 and the second wall, and the first chamber 31 and the second chamber 32 are separate from each other. In addition, like the first wall 23, the second wall is provided with a third opening, and each battery cell 10 passes through the second opening 24 and the third opening corresponding thereto. In this way, each battery cell 10 may include two first portions and a second portion located between the two first portions, with the second portion 12 being located between the second opening 24 and the third opening, and the two first portions 11 being located on two sides of the second portion 12, respectively.

Therefore, during installation of the battery cell 10, a position of each battery cell can be determined only by disposing the battery cell 10 in the corresponding second opening 24 and third opening. This is a simple and fast installation process. Moreover, the two end faces of the battery cell 10 both lie inside the first chamber 31, so the pressure relief mechanism 13 and the circuit board assembly 40 provided on the end faces are also located inside the first chamber 31. In this way, when the binder is injected into the second chamber 32, the binder does not affect the pressure relief mechanism 13 and the circuit board assembly inside the first chamber 31, ensuring the safety of the battery 101.

Optionally, the second opening 24 and/or the third opening is provided with an enclosing structure 25, where the enclosing structure 25 is perpendicular to the first wall 23 or second wall and extends towards the outside of the support 20, and the enclosing structure is configured to support the battery cell 10. For example, as shown in FIG. 2 to FIG. 4, the second opening 24 and the third opening each may be provided with the enclosing structure 25, where the enclosing structure 25 is a hollow and cylindrical structure consistent with the shape of the battery cell 10 such that each battery cell 10 can be disposed within the enclosing structure 25. The enclosing structure 25 can be configured to support the battery cell 10, ensuring the stability of the battery cell 10. In addition, because the enclosing structure 25 is attached to the outer surface of the battery cell 10, when the binder is injected into the second chamber 32, the excess binder does not flow out of the second opening 24 or the third opening to enter the first chamber 31, so the pressure relief mechanism 13 located in the first chamber 31 is not affected, thereby ensuring the normal use of the pressure relief mechanism 13, and the electrode terminal 14 and circuit board assembly 40 located in the first chamber 31 are not affected either, thereby ensuring the normal installation and use of the battery 101. In order to avoid the binder overflowing through the enclosing structure 25, a gap between the enclosing structure 25 and a surface of the battery cell 10 is usually set to 0 to 0.6 mm.

In this embodiment of this application, after the multiple battery cells 10 included in the battery 101 are installed in the second opening 24 and the third opening of the support 20, the circuit board assembly 40 is fixed to an outer end face of the battery cells 10. Specifically, the support 20 may be provided with a limiting post 26, and correspondingly, the circuit board assembly 40 is provided with a through hole 42, where the limiting post 26 and the through hole 42 cooperate with each other to limit the circuit board assembly 40. As shown in FIG. 2 to FIG. 4, at least one limiting post 26 protruding from the surface of the first wall 23 may be provided on the first wall 23 of the support 20. For example, two limiting posts 26 may be provided. Correspondingly, the circuit board assembly 40 is provided with through holes 42. For example, the same number of through holes 42 as the limiting posts 26 may be provided. The through hole 42 passes through at least part of the limiting post 26 to ensure that the circuit board assembly 40 does not translate on a plane parallel to the first wall 23.

Optionally, a boss 261 is provided at an end of the limiting post 26 farther away from the support 20, where the boss 261 has a radial dimension smaller than the rest of the limiting post 26, and the through hole 42 has a dimension larger than the boss 261 but smaller than the rest of the limiting post 26 so as to limit the circuit board assembly 40. As shown in FIG. 2 to FIG. 4, the boss 261 allows the circuit board assembly 40 to be located on which the boss 261 is located, without excessive movement in the axial direction of the limiting post 26, thereby fixing the position of the circuit board assembly 40 and facilitating the welding of the circuit board assembly 40 to the battery cell 10.

In this embodiment of this application, the second chamber 32 is filled with the binder. In order to make the binder not overflow into the first chamber 31, the support 20 may be further provided with a binder damper structure 22, where the binder damper structure 22 is configured to prevent the binder in the second chamber 32 from entering the first chamber 31.

Optionally, the binder damper structure 22 of this embodiment of this application may have various implementations, for example, as shown in FIG. 2 to FIG. 4, the binder damper structure 22 may be a first limiting slot 22, and correspondingly, the inner surface of the box 30 is provided with a structure corresponding to the first limiting slot 22 so as to cooperate with the first limiting slot 22.

Figure 5:
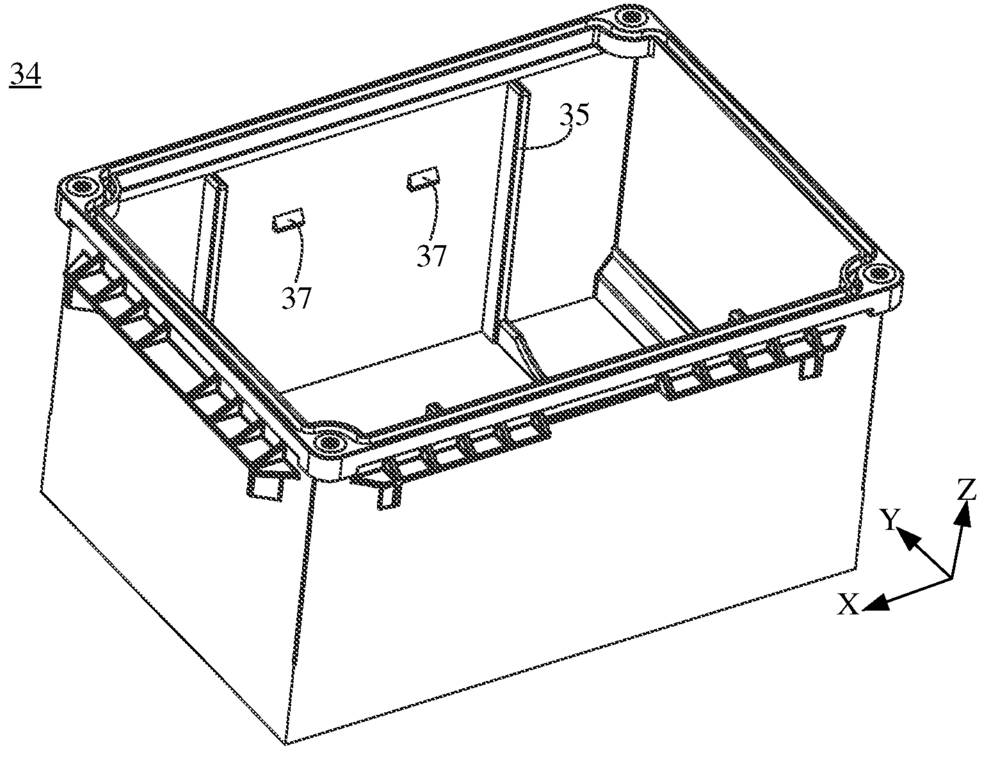
FIG. 5 is a schematic structural diagram of a lower box body according to an embodiment of this application.

Optionally, in an embodiment, a first limiting strip 35 corresponding to the first limiting slot 22 may be provided on the inner surface of the wall of the box 30, where the first limiting strip 35 is stuck into the first limiting slot 22 so as to prevent the binder in the second chamber 32 from entering the first chamber 31. FIG. 5 illustrates a possible implementation of the lower box body 34 according to this embodiment of this application. As shown in FIG. 5, a first limiting strip 35 is provided on the inner surface of at least one wall of the box 30, for example, the first limiting strip 35 is provided on each of two side walls and one bottom wall of the lower box body 34 in FIG. 5, where the first limiting strip 35 is stuck into the first limiting slot 22, which can increase paths of the binder overflowing out of the second chamber 32, thus preventing the binder from overflowing from the second chamber 32 into the first chamber 31 and avoiding the failure of the pressure relief mechanism 13 caused by the binder overflowing onto the surface of the pressure relief mechanism 13.

Figure 6:
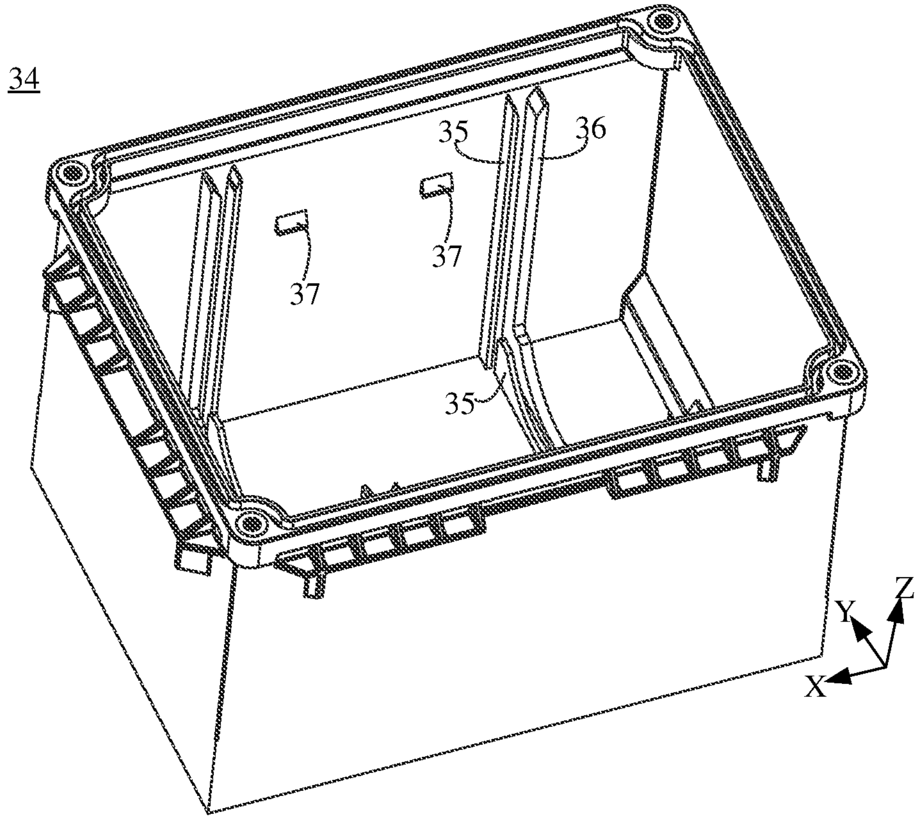
FIG. 6 is a schematic structural diagram of another lower box body according to an embodiment of this application.
Figure 7:
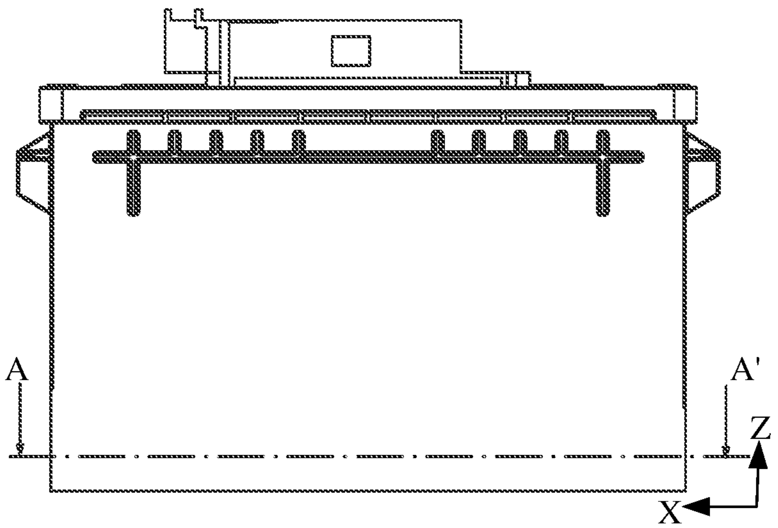
FIG. 7 is a side view of a lower box body accommodating a support according to an embodiment of this application.
Figure 8:
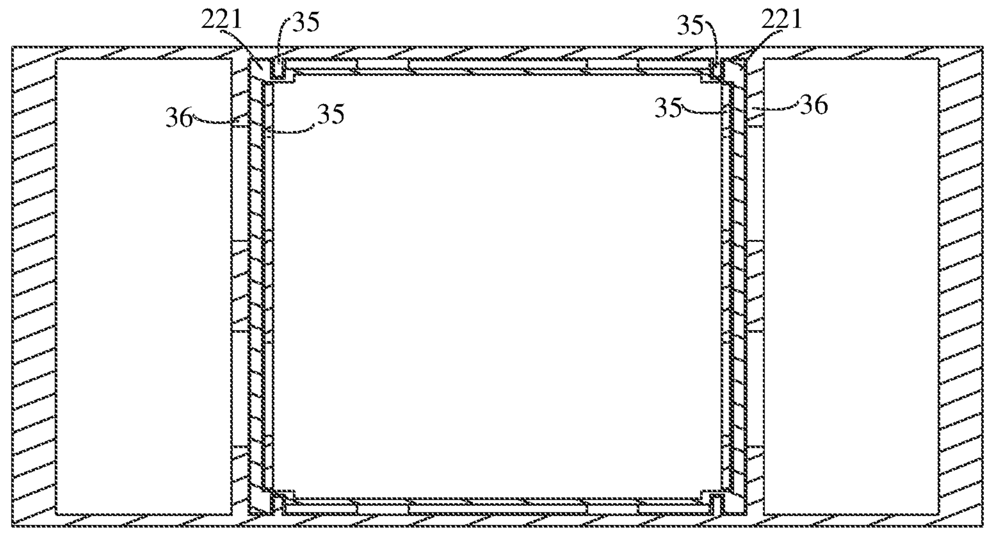
FIG. 8 is a cross-sectional view of the lower box body accommodating a support as shown in FIG. 7.

Optionally, in another embodiment, to strengthen the anti-overflow effect of the binder, a second limiting strip 36 corresponding to the first limiting strip 35 may further be provided on the inner surface of a wall of the box 30, where the first limiting strip 35 and the second limiting strip 36 form a second limiting slot, and one side wall 221 of the first limiting slot is stuck into the second limiting slot so as to prevent the binder in the second chamber 32 from entering the first chamber 31. FIG. 6 illustrates another possible implementation of the lower box body 34 according to this embodiment of this application, FIG. 7 shows a side view of the lower box body 34 accommodating the support 20 as shown in FIG. 6, and FIG. 8 shows a schematic cross-section of the lower box body 34 accommodating the support 20 as shown in FIG. 7, where the cross-section is cut in direction A-A' as shown in FIG. 7. As shown in FIG. 6 to FIG. 8, the first limiting strip 35 and a second limiting strip 36 is provided on the inner surface of at least one wall of the lower box body 34, where the first limiting strip 35 and the second limiting strip 36 are parallel to each other to form the second limiting slot, for example, the second limiting slot is provided on each of the two side walls and the one bottom wall of the lower box body 34 in the figures, and the first limiting slot on the support 20 has two side walls, one of which 221 is stuck into the second limiting slot so as to prevent the binder in the second chamber 32 from entering the first chamber 31. This can further increase overflow paths of the binder so as to reduce the risk of overflow of the binder and to avoid failure of the pressure relief mechanism 13 caused by the binder overflowing and obscuring the surface of the pressure relief mechanism 13.

It should be understood that for the lower box body 34 as shown in FIG. 5 to FIG. 8, when the first limiting strip 35 is provided on each of multiple walls of the lower box body 34 and/or the second limiting strip 36 is provided on each of multiple walls of the lower box body 34, the first limiting strips 35 on the multiple walls may be an interconnected one-piece structure, for example, as shown in FIG. 5; or the first limiting strips 35 on the multiple walls may be multiple strip-like structures having gaps which are not connected to each other, for example, as shown in FIG. 6, the gaps between the multiple first limiting strips 35 may be used to avoid the structure on the support 20 or may be used to avoid other components within the box 30; similarly, the multiple second limiting strips 36 on the walls may alternatively be interconnected one-piece structures or multiple structures separated from each other. The embodiments of this application are not limited thereto.

Figure 9:
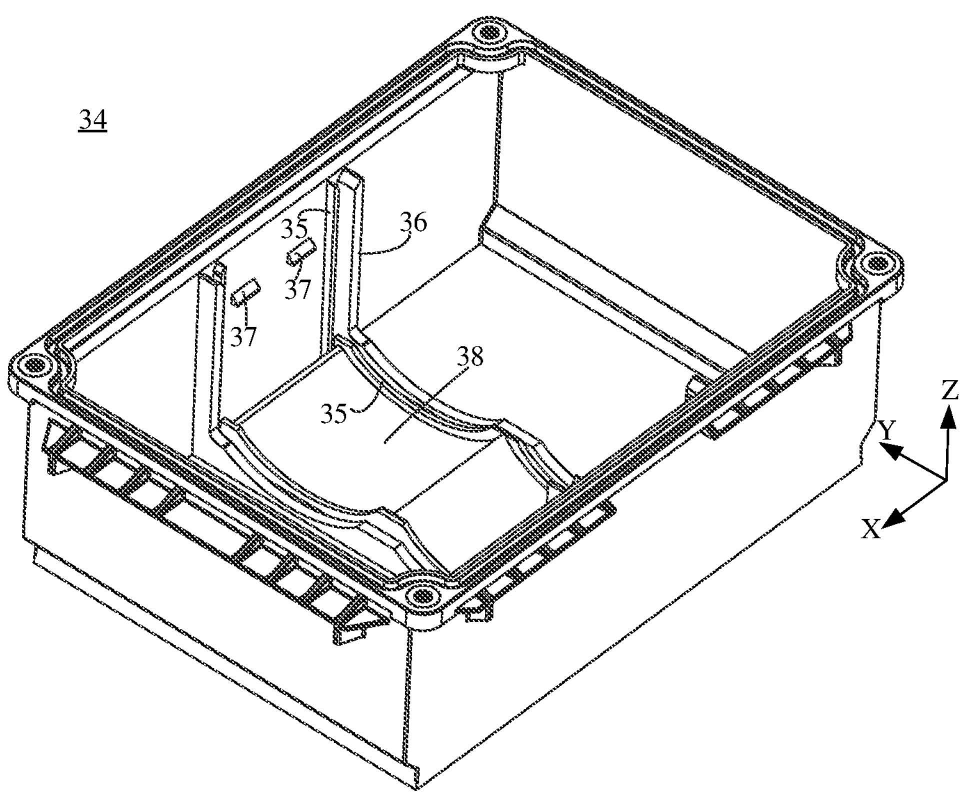
FIG. 9 is a schematic structural diagram of still another lower box body according to an embodiment of this application.

Optionally, a profiling structure 38 may further be provided on the inner surface of the bottom wall of the box 30 according to this embodiment of this application, where the profiling structure 38 may be located on the bottom wall of the lower box body 34 and within the second chamber 32, a surface of the profiling structure 38 facing toward the second portion 12 is attached to the second portion 12, and the profiling structure 38 is configured to fill the space between the second portion 12 and the bottom wall of the box 30. Specifically, FIG. 9 illustrates a further possible implementation of the lower box body 34 according to this embodiment of this application. As shown in FIG. 9, the profiling structure 38 is provided on the bottom wall of the lower box body 34, and the profiling structure 38 is capable of being attached to the surface of the battery cell 10. For example, for the cylindrical battery cell 10, a surface of the profiling structure 38 facing toward the battery cell 10 is arc shaped, and the profiling structure 38 is capable of filling the space between the second portion of the battery cell 10 and the bottom wall of the lower box body 34. In this way, when the binder is injected into the second chamber 32, the profiling structure 38 occupies part of the space inside the second chamber 32, reducing a space to be filled by the binder and reducing the amount of binder, which can reduce the costs, also avoid the overflow of the binder due to excessive amount of the binder, and improve the safety of the battery 101.

It should be understood that in this embodiment of this application, the battery cell 10, the support 20, and the box 30 can be fixedly connected to each other by the binder; and further, the support 20 can be provided with a first buckle 27 and the box 30 is provided with a second buckle 37 on its side wall, where the first buckle 27 and the second buckle 37 cooperate with each other to fix the support 20 in the box 30. Optionally, the support 20 can be provided with multiple first buckles 27 and the box 30 can be provided with multiple corresponding second buckles 37. For example, as shown in FIG. 2 to FIG. 9, two first buckles 27 are provided on one side wall of the support 20 in a first direction X, where the first direction X may be a length direction of the support, and correspondingly, two second buckles 37 are provided on one side wall of the box 30 such that the support 20 cannot move inside the box 30 in a second direction Z, where the second direction Z is a height direction of the support 20.

During assembly of the battery 101, the multiple battery cells 10 can be first fixed to the support 20, for example, the battery cells 10 can be fixed through the second opening 24 and/or the third opening, and then the circuit board assembly 40 can be fixed to the battery cells 10. For example, the circuit board assembly 40 can be fixed through cooperation between the limiting posts 26 and the through holes 42, and the circuit board assembly 40 can be fixed to the battery cells 10 through welding and other ways, thus realizing the assembly process between the multiple battery cells 10 and the support 20. Finally, the battery cells 10 fixed as a one-piece structure and the support 20 are fixed in the box 30, for example, they can be fixed in the lower box body 34 first, specifically, the support 20 can be slid into the lower box body 34 through the first limiting slot 22 on the support 20 along the first limiting strip 35 in the box 30, and then the first buckle 27 on the support 20 cooperates with the second buckle 37 on the box 30, such that the support 20 and the box 30 are relatively stable. After that, the binder is injected into the second chamber 32 through the first opening 21 on the support 20 so as to achieve a fixed connection among the battery cell 10, the support 20, and the box 30.

The foregoing describes the battery 101 and the electric device 100 in the embodiments of this application; and the following describes a method and device for manufacturing battery in the embodiments of this application. For those not described in detail, refer to the foregoing embodiments.

Figure 10:
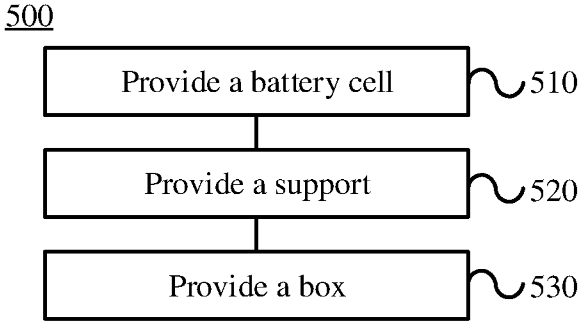
FIG. 10 is a schematic flowchart of a method for manufacturing battery according to an embodiment of this application.

FIG. 10 is a schematic flowchart of a method 500 for manufacturing battery according to an embodiment of this application. As shown in FIG. 10, the method 500 includes: S510: providing a battery cell 10; S520: providing a support 20, where the support 20 is configured to support the battery cell 10; and S530: providing a box 30, where the box 30 is configured to accommodate the support 20 and the battery cell 10. The support 20 separates the box 30 into a first chamber 31 and a second chamber 32, where the first chamber 31 is configured to accommodate a first portion 11 of the battery cell 10, the first portion 11 is provided with a pressure relief mechanism 13, the second chamber 32 is configured to accommodate a second portion 12 of the battery cell 10 and a binder, and in the second chamber 32, the second portion 12, the support 20, and the box 30 are fixedly connected through the binder. The pressure relief mechanism 13 is configured to be actuated when internal pressure of the battery cell 10 reaches a threshold to release the internal pressure.

Figure 11:
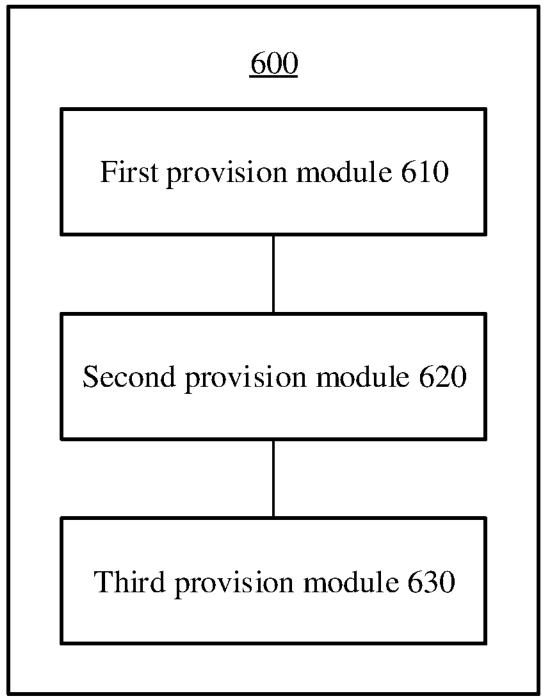
FIG. 11 is a schematic block diagram of a device for manufacturing battery according to an embodiment of this application.

FIG. 11 is a schematic block diagram of a device 600 for manufacturing battery according to an embodiment of this application. As shown in FIG. 11, the device 600 includes: a first provision module 610 configured to provide a battery cell 10; a second provision module 620 configured to provide a support 20, where the support 20 is configured to support the battery cell 10; and a third provision module 630 configured to provide a box 30, where the box 30 is configured to accommodate the support 20 and the battery cell 10. The support separates the box 30 into a first chamber 31 and a second chamber 32, where the first chamber 31 is configured to accommodate a first portion 11 of the battery cell 10, the first portion 11 is provided with a pressure relief mechanism 13, the second chamber 32 is configured to accommodate a second portion 12 of the battery cell 10 and a binder, and in the second chamber 32, the second portion 12, the support 20, and the box 30 are fixedly connected through the binder. The pressure relief mechanism 13 is configured to be actuated when internal pressure of the battery cell 10 reaches a threshold to release the internal pressure.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. A battery, comprising:

a battery cell;

a support configured to support the battery cell; and a box configured to accommodate the support and the battery cell;

wherein the support separates the box into two first chambers and a second chamber;

the battery cell comprises two first portions at two ends of the battery cell, and a second portion in the middle of the battery cell;

the first chambers are configured to accommodate the first portions of the battery cell, respectively, and one of the first portions is provided with a pressure relief mechanism configured to be actuated when internal pressure of the battery cell reaches a threshold;

the second chamber is configured to accommodate the second portion of the battery cell and a binder, and in the second chamber, the second portion, the support, and the box are fixedly connected through the binder;

the support comprises a first wall and a second wall opposite the first wall, a second opening is provided in the first wall, and a third opening is provided in the second wall; and the battery cell passes through the second opening and the third opening, with the second portion being located inside the support between the second opening and the third opening, and the first portions being located outside of the second opening and the third opening, respectively.

2. The battery according to claim 1, wherein the support is provided with a first opening, the first opening communicates with the second chamber, and the first opening is configured for injecting the binder into the second chamber.

3. The battery according to claim 1, wherein the support is provided with a binder damper structure, the binder damper structure is configured to prevent the binder in the second chamber from entering the first chambers.

4. The battery according to claim 3, wherein the binder damper structure is a first limiting slot, a first limiting strip corresponding to the first limiting slot is provided on the inner surface of a wall of the box, and the first limiting strip is stuck into the first limiting slot, so as to prevent the binder in the second chamber from entering the first chambers.

5. The battery according to claim 4, wherein a second limiting strip corresponding to the first limiting strip is further provided on the inner surface of the wall of the box, the first limiting strip and the second limiting strip form a second limiting slot, and one of side walls of the first limiting slot is stuck into the second limiting slot, so as to prevent the binder in the second chamber from entering the first chambers.

6. The battery according to claim 1, wherein the second opening and/or the third opening are/is provided with an enclosing structure, the enclosing structure is perpendicular to the first wall or the second wall and extends towards the outside of the support, and the enclosing structure is configured to support the battery cell.

7. The battery according to claim 1, wherein the first wall is perpendicular to a bottom wall of the box.

8. The battery according to claim 1, wherein one of the first portions is further provided with an electrode terminal, the electrode terminal is electrically connected to a busbar, and the first chamber is further configured to accommodate the busbar.

9. The battery according to claim 8, further comprising:

a circuit board assembly, wherein the busbar is provided on the circuit board assembly, and the first chamber is further configured to accommodate the circuit board assembly; and wherein the circuit board assembly is provided with a through hole, the support is provided with a limiting post, and the limiting post cooperates with the through hole to limit the circuit board assembly.

10. The battery according to claim 9, wherein a boss is provided at an end of the limiting post farther away from the support, the boss has a radial dimension smaller than the rest of the limiting post, and the through hole has a dimension larger than the boss but smaller than the rest of the limiting post, so as to limit the circuit board assembly.

11. The battery according to claim 1, wherein a first buckle is provided on the support, and a second buckle is provided on a side wall of the box, the first buckle and the second buckle cooperate with each other to secure the support in the box.

12. The battery according to claim 1, wherein the battery cell is a cylindrical battery cell, each of the first portions comprises an end surface of the cylindrical battery cell, and the pressure relief mechanism is provided on one end surface of the cylindrical battery cell.

13. The battery according to claim 1, wherein a profiling structure is provided on the inner surface of a bottom wall of the box, the profiling structure is located in the second chamber, a surface of the profiling structure facing toward the second portion is attached to the second portion, and the profiling structure is configured to fill a space between the second portion and the bottom wall of the box.

14. An electric device, comprising the battery according to claim 1, wherein the battery is configured to supply electric energy.

15. A method for manufacturing a battery, comprising:

providing a battery cell;

providing a support, wherein the support is configured to support the battery cell; and providing a box, wherein the box is configured to accommodate the support and the battery cell;

wherein the support separates the box into two first chambers and a second chamber;

the battery cell comprises two first portions at two ends of the battery cell, and a second portion in the middle of the battery cell;

the first chambers are configured to accommodate the first portions of the battery cell, respectively, and one of the first portions is provided with a pressure relief mechanism configured to be actuated when internal pressure of the battery cell reaches a threshold;

the second chamber is configured to accommodate the second portion of the battery cell and a binder, and in the second chamber, the second portion, the support, and the box are fixedly connected through the binder;

the support comprises a first wall and a second wall opposite the first wall, a second opening is provided in the first wall, and a third opening is provided in the second wall; and the battery cell passes through the second opening and the third opening, with the second portion being located inside the support between the second opening and the third opening, and the first portions being located outside of the second opening and the third opening, respectively.

16. A device for manufacturing a battery, comprising:

a first provision module configured to provide a battery cell;

a second provision module configured to provide a support, wherein the support is configured to support the battery cell; and a third provision module configured to provide a box; wherein the box is configured to accommodate the support and the battery cell;

wherein the support separates the box into two first chambers and a second chamber;

the battery cell comprises two first portions at two ends of the battery cell, and a second portion in the middle of the battery cell;

the first chambers are configured to accommodate the first portions of the battery cell, respectively, and one of the first portions is provided with a pressure relief mechanism configured to be actuated when internal pressure of the battery cell reaches a threshold;

the second chamber is configured to accommodate the second portion of the battery cell and a binder, and in the second chamber, the second portion, the support, and the box are fixedly connected through the binder;

the support comprises a first wall and a second wall opposite the first wall, a second opening is provided in the first wall, and a third opening is provided in the second wall; and the battery cell passes through the second opening and the third opening, with the second portion being located inside the support between the second opening and the third opening, and the first portions being located outside of the second opening and the third opening, respectively.

* * * * *